US009594858B1

(12) United States Patent
Tseng et al.

(10) Patent No.: US 9,594,858 B1
(45) Date of Patent: Mar. 14, 2017

(54) METHODS, SYSTEMS, AND ARTICLES OF MANUFACTURE FOR IMPLEMENTING SCALABLE STATISTICAL LIBRARY CHARACTERIZATION FOR ELECTRONIC DESIGNS

(71) Applicant: Cadence Design Systems, Inc., San Jose, CA (US)

(72) Inventors: Hing Key Kenneth Tseng, Beijing (CN); Ling Wang, Beijing (CN); Shuilong Chen, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 161 days.

(21) Appl. No.: 14/494,433

(22) Filed: Sep. 23, 2014

(51) Int. Cl.
*G06F 17/50* (2006.01)

(52) U.S. Cl.
CPC ........ *G06F 17/5031* (2013.01); *G06F 17/504* (2013.01); *G06F 17/5081* (2013.01); *G06F 2217/10* (2013.01); *G06F 2217/84* (2013.01)

(58) Field of Classification Search
None
See application file for complete search history.

(56) References Cited

U.S. PATENT DOCUMENTS

| | | | |
|---|---|---|---|
| 7,383,166 B2 * | 6/2008 | Ashar | G06F 17/504 703/13 |
| 8,181,144 B2 * | 5/2012 | Tetelbaum | G06F 17/5031 716/113 |
| 8,495,544 B2 * | 7/2013 | Celik | G06F 17/5031 716/113 |
| 8,799,838 B2 * | 8/2014 | Tanimoto | G06F 17/5045 716/107 |
| 8,887,109 B1 * | 11/2014 | Krishna Mohan | G01R 31/31836 716/101 |

(Continued)

FOREIGN PATENT DOCUMENTS

AU 2013263846 A1 * 11/2013 ............. G06F 19/00

OTHER PUBLICATIONS

C. Forzan et al., "Why We Need Statistical Static Timing Analysis," 2007 IEEE, pp. 91-96.*

(Continued)

*Primary Examiner* — Leigh Garbowski
(74) *Attorney, Agent, or Firm* — Vista IP Law Group, LLP

(57) ABSTRACT

Various embodiments scalable statistical library characterization for electronic designs by identifying an electronic design, performing circuit simulations on strongly connected components on a component-by-component basis, performing the logic cone analysis on the entire electronic design, and performing combinations of influences on the electronic design caused by variations of parameters. Some embodiments perform simulations on one or more stronger parameters or the strongest parameter of a circuit component and use the simulation results to calibrate the predicted behaviors of one or more remaining circuit components of the electronic design. Various statistical or mathematical techniques may be used for performing the combinations of influences on the electronic design caused by variations of parameters. The techniques described are scalable with the increase in complexities and sizes of electronic designs while reducing or minimizing the impact on sensitivity accuracy.

20 Claims, 12 Drawing Sheets

(56) References Cited

U.S. PATENT DOCUMENTS

| | | | |
|---|---|---|---|
| 9,262,557 B2 * | 2/2016 | Levitt | G06F 17/504 |
| 2002/0042704 A1 | 4/2002 | Najm et al. | |
| 2015/0154330 A1 * | 6/2015 | Yachide | G06F 17/5022 |
| | | | 716/102 |

OTHER PUBLICATIONS

Non-Final Office Action for U.S. Appl. No. 12/970,912 dated Mar. 24, 2011.
R.D. Freeman et al., "Automated Extraction of SPICE Curcuit Models from Symbolic Gate Matrix Layout with Pruning," 1986, IEEE, pp. 418-424.
Emrah Acar et al., "Leakage and Leakage Sensitivity Computation for Combinational Circuits," 2003, AMC, pp. 96-99.
Luis Guerra e Silva et al., "Algorithms for solving Boolean satisfiability in combinational circuits," 1999, ACM, pp. 1-5.
Dan Souder et al., "JSPICE: a component-based distributed Java front-end for SPICE," 1998, Concurrency: Practice and Experience, pp. 1131-1141.
Non-Final Office Action for U.S. Appl. No. 11/943,529 dated Sep. 29, 2010.
Notice of Allowance for U.S. Appl. No. 11/943,529 dated Jan. 21, 2011.
Notice of Allowance for U.S. Appl. No. 12/970,912 dated Dec. 14, 2011.

* cited by examiner

| Parameter/Transistor | M1 | M2 | M3 | M4 |
|---|---|---|---|---|
| Tox | 4 | ~0 | 8 | 3 |
| Dxl | 25 | ~0 | ~0 | 1 |
| Dxw | 1 | ~0 | 16 | ~0 |
| Par1 | 9 | ~0 | ~0 | 27 |
| Par2 | -16 | ~0 | -4 | -9 |

FIG. 4

METHODS, SYSTEMS, AND ARTICLES OF MANUFACTURE FOR IMPLEMENTING SCALABLE STATISTICAL LIBRARY CHARACTERIZATION FOR ELECTRONIC DESIGNS

CROSS-REFERENCE TO RELATED APPLICATION(S)

This Application is related to U.S. Pat. No. 7,937,256 filed on Nov. 20, 2007 and entitled "SYSTEMS AND METHODS OF EFFICIENT LIBRARY CHARACTERIZATION FOR INTEGRATED CIRCUIT CELL LIBRARIES" and U.S. Pat. No. 8,160,858 filed on Dec. 16, 2010 and entitled "SYSTEMS AND METHODS OF EFFICIENT LIBRARY CHARACTERIZATION FOR INTEGRATED CIRCUIT CELL LIBRARIES". The contents of the aforementioned U.S. patents are hereby expressly incorporated by reference in their entireties for all purposes.

BACKGROUND

Library characterization extracts the electrical behavior and functional model of every logic gate in a cell library, given the transistor level circuitry and manufacturing process models. Library characterization is nonetheless a very computation intensive process that often requires tens or even hundreds of computers, if not more, running the characterization program in parallel, over a duration of several weeks or even several months to generate a complete set of library that may be used in modern electronic design. Recent design methodologies require even more variants in a cell library in terms of, for example, process, supply voltage, and temperature variations and thus result in even more intensive computations.

Statistical library characterization involves modeling the influence from randomly varying process parameters on the timing models in a standard cell library. Statistical library characterization is normally performed by a finite difference method of simulating the timing sensitivity on each process parameter on each transistor in the cell design and then calculates their total timing effect by computing the square root of the sum of their squares. As cell design complexities increase by a factor of N (e.g., the total number of transistors increases by a factor of N), and the number of process parameters increases by a factor of P, and each simulation (e.g., digital, analog, or mixed signal simulation) time increase super-linearly with N, the performance of statistical library characterization will degrade by a factor of at least $N^2 \times P$.

Therefore, there exists a need for a method and a system for implementing scalable statistical library characterization for electronic designs without having the aforementioned issues, disadvantages, or problems. The advantages of the various embodiments described herein are numerous. Most notably, the methods and systems described herein provide regular and statistical library characterization to increase the speed and accuracy of the computation of library characterization.

SUMMARY

Disclosed are method(s), system(s), and article(s) of manufacture for implementing scalable statistical library characterization for electronic designs in one or more embodiments. Some embodiments are directed at a method for implementing scalable statistical library characterization for electronic designs. In some embodiments, the method uses one or more computing system to perform the acts of identifying an electronic design; performing one or more simulations on a plurality of strongly connected components in the electronic design; performing logic cone sensitivity analysis for the electronic design; and characterizing the electronic design by performing combinations of influences of a plurality of parameters of the plurality of strongly connected components in the electronic design. In some of these embodiments, the one or more simulations are performed on a component-by-component basis, and the logic cone sensitivity analysis is performed on the electronic design.

The method that performs the one or more simulations may further use the one or more computing system to optionally perform the acts of identifying a strongly connected component from the plurality of strongly connected components of the electronic design; and performing the one or more simulations on the strongly connected component, wherein the one or more simulations include a general purpose circuit simulation. In some of the preceding embodiments, the method may further use the one or more computing system to perform the acts of repeating the one or more simulations on one or more remaining strongly connected components of the plurality of strongly connected components, wherein the strongly connected component includes a circuit component that generates a feedback to another circuit component in the electronic design which feeds back to itself.

In some embodiments, the method that performs the logic cone sensitivity analysis may use the one or more computing system to perform the acts of characterizing the electronic design to identify one or more logic cones for a strongly connected component in the electronic design; and automatically extracting one or more strongly connected components in the one or more logic cones. In some of these immediately preceding embodiments, the method that performs the logic cone sensitivity analysis may further use the one or more computing systems to perform the acts of characterizing the electronic design to identify one or more logic cones for a strongly connected component in the electronic design; and automatically extracting one or more strongly connected components in the one or more logic cones.

In addition or in the alternative, the method that performs the logic cone sensitivity analysis may also use the one or more computing systems to perform the acts of Identifying at least one strongly connected component that is not within the one or more logic cones; and excluding at least one strongly connected component from further analyses or simulations.

In performing the logic cone sensitivity analysis, the method may use the one or more computing systems to perform at least one of the acts of ignoring variations of one or more first circuit components in the logic cone sensitivity analysis, wherein the one or more first circuit components are not in the one or more logic cones; ignoring capacitive load variations of one or more second circuit components, wherein the one or more second circuit components are in the one or more logic cones and are not connected to strongly connected components or one or more interconnects connected to the strongly connected components; and ignoring effects of a circuit component on the logic cone sensitivity analysis of a first strongly connected component by neglecting variations of the circuit component, wherein the circuit component is in a fan-out cone of the first strongly connected component. In addition or in the alternative, the method that performs the logic cone sensitivity analysis may further use the one or more computer systems to perform the act of accounting for an impact of a circuit component on a first strongly connected component by including the circuit component in the logic cone sensitivity analysis for the first strongly connected component, wherein the circuit component is within a fan-in cone of the first strongly connected component.

In characterizing the electronic design by performing the combinations of the influences, the method may use the one or more computer systems to perform the acts of identifying one or more parameters as an equivalent behavior model of a strongly connected component of the electronic design; and performing the one or more simulations with variations of the one or more parameters. In addition or in the alternative, the method that characterizes the electronic design by performing the combinations of the influences may use the one or more computer systems to perform the acts of determining behavior data for a parameter of the one or more parameters of the strongly connected component; determining combined behavior data of all of the one or more parameters; and determining sensitivity data for the electronic design by using at least the combined behavior data for all of the plurality of strongly connected components.

In some of these immediately preceding embodiments, the method may further use the one or more computer systems to perform the acts of calibrating the sensitivity data by using at least an error factor and a number of standard deviations. In addition or in the alternative, the method may use the one or more computer systems to perform the acts of determining one or more predicted values of one or more parameters of a strongly connected component of the plurality of strongly connected components by using one or more simplified models, without performing simulations; and determining one or more simulated values of at least one parameter of the one or more parameters by performing the one or more simulations with the at least one parameter. Additionally or alternatively, the method may use the one or more computer systems to perform the acts of determine a ratio for the strongly connected component based at least in part upon the one or more simulated values and the one or more predicted values; and calibrating at least one of the one or more predicted values by using the ratio.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 4 illustrates a table including timing sensitivity information as predicted by an RC model for each transistor—parameter combination in some embodiments.

DETAILED DESCRIPTION

Figure 1:
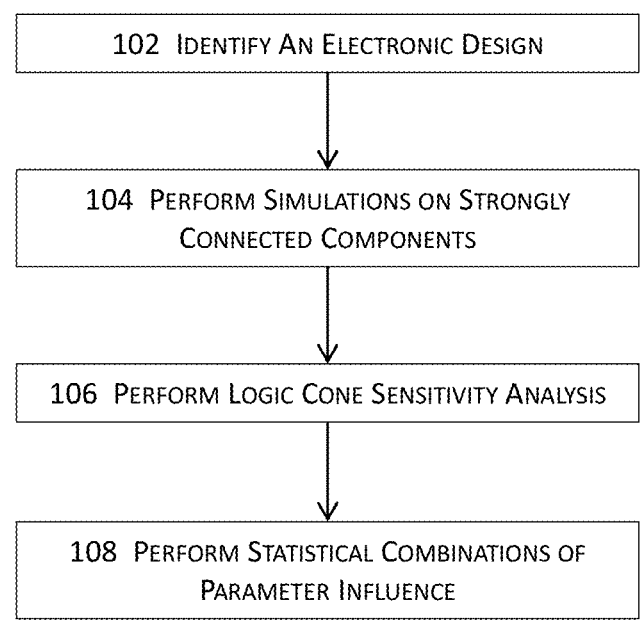
FIG. 1 illustrates a high level block diagram for a method or system for implementing scalable statistical library characterization for electronic designs in some embodiments.

Various embodiments of the invention are directed to a methods, systems, and articles of manufacture for implementing scalable statistical library characterization for electronic designs. Other objects, features, and advantages of the invention are described in the detailed description, figures, and claims. Furthermore, various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Various embodiments are directed at implementing scalable statistical library characterization for electronic designs. Statistical library characterization involves modeling the influence from randomly varying process parameters on the timing models in a standard cell library. This is normally performed by a finite difference method of simulating the sensitivity on each process parameter (e.g., how sensitive timing changes as the value of the process parameter varies) on each transistor in the cell design and then calculating their total timing effect by computing the square root of the sum of their squares. In various embodiments, the term "simulating" or "simulation" may include one or more simulations in the digital domain for digital circuit designs, one or more simulations in the analog domain for analog circuit designs, or any combinations thereof for mixed-signal circuit designs. As cell design complexities increase by a factor of N, and the number of process parameters increase by a factor of P, and each simulation time increase super-linearly with N, the performance of statistical library characterization will degrade by a factor of at least $N^2P$.

The techniques described for implementing scalable statistical library characterization for electronic designs include three major areas: the SSC (strongly connected component)-based circuit simulations, logic cone sensitivity analysis, and combination of parameter influences. It shall be noted that various techniques described herein apply with full and equal effects to digital circuit libraries, analog circuit libraries, and mixed-signal circuit libraries. For example, the techniques of identifying logic cones, individually simulating a strongly connected component, performing logic cone sensitivity analyses, performing statistical or mathematical combinations of influences of parameters, etc. described herein may apply to digital circuits, analog circuits, or mixed-signal circuits although different methodologies may be used for analog circuits and digital circuits. For example, different simulation methodologies, the partitioning methodologies, etc. may be used for digital circuit and analog circuits.

Various methods perform circuit simulations (e.g., general purpose circuit simulations including, for example, digital, analog, or mixed-signal simulations) on a component-by-component basis for each strongly connected component of interest, rather than performing such circuit simulations for several strongly connected components or even the entire electronic design (e.g., a standard cell design) as some conventional approaches do. These methods nevertheless perform the sensitivity analysis for the entire electronic design or an arc.

One of the advantages of performing circuit simulations for each strongly connected component individually is that simulating a single strongly connected component is faster than simulating more than a single component at a time. Simulating all components by simulating each component individually may be faster than simulating all components together. Therefore, the sizes and complexities of the design are thus disengaged from the performance of simulators, and the techniques described herein may thus be scalable with the increase of complexities and/or sizes of electronic designs.

The impact of circuit simulations on a component-by-component basis for each strongly connected component of interest may also be reduced or even minimized due to the fact that the errors caused by simulating each strongly connected component of interest individually cancel out from each other. Another advantage of performing circuit simulations for each strongly connected component of interest is that during the logic cone analysis, the methods may ignore circuit components that are unrelated to the arc. More details about circuit simulations will be described in greater details in the following sections.

The logic cone analysis—the second major area of various embodiments—may partition an electronic design to identify a number of logic cones that matches the number of outputs. In some embodiments where the electronic circuit is large or complex, the electronic circuit may be partitioned into logic cones to reduce the number of circuit components that need to be considered jointly during, for example, test vector generation or simulations. A logic cone may include a section having one or more hierarchical levels of the electronic circuit a section of logic receiving inputs from multiple input sources and generating a single output. In these embodiments, a logic cone may include all inputs and the logic circuits that affect one designated output of the electronic design (e.g., a cell or a block). A logic cone may overlap with another logic cone of the electronic design because, as described above, these two logic cones may share common input signals or intermediate signals generated from the circuitry of the logic cone and used in another logic cone or vice versa.

The methods may automatically extract the strongly connected components between a pin and a probe in some embodiments. In these embodiments, the methods may ignore those strongly connected components and interconnections that are included in any logic cones identified by partitioning and do not include these strongly connected components in the circuit simulations. For example, any transistor variations outside the identified logic cones may be ignored and excluded from circuit simulations.

In addition or in the alternative, the methods may further ignore and exclude from circuit simulations any capacitive load variations that are touched by the strongly connected components of interests and interconnections therefor in some logic cones but are driven by voltage sources. In some embodiments, the methods may perform the logic cone analysis by considering parameter variations (e.g., variations of one or more transistor parameters) in the fan-in cone of a strongly connected component of interest yet ignore the parameter variations in the fan-out cone of the strongly connected component. More details about logic cone analysis will be described in greater details in the following sections.

The combination of parameter influences—the third major area of various embodiments—determines the circuit behavior (e.g., the timing delta) of each circuit component of interest for the variations of each parameter. The methods may then combine these circuit behaviors of all parameters for a circuit component of interest and further combine these combined circuit behaviors from all circuit components of interest. Various mathematical or statistical techniques may be used to for the combinations described above, and some illustrative techniques are described below with references to, for example, FIG. 1C.

Some embodiments do not require simulations with all parameters changing to account for variations of all parameters of a circuit component (e.g., a strongly connected component). Rather, these embodiments simulate one or more stronger or the strongest parameter (in terms of the influence of the variations of a parameter), determine the values of sensitivity of all parameters predicted by some simplified model (e.g., an RC delay model to predict sensitivity of variations of parameters), and calibrate the sensitivity values of the non-simulated parameters by using the simulated sensitivity value(s) of the one or more stronger parameters or the strongest parameter. More details about parameter influence combination will be described in greater details in the following sections.

In some embodiments, the methods or systems may include a strongly connected component (SCC)-based general purpose circuit simulation module such as a SPICE (Simulation Program with Integrated Circuit Emphasis) module or SPICE-like simulation module, or any other analog, digital, or mixed signal simulation modules. These embodiments may further include a logic cone sensitivity analysis module and one or more statistical operations module to perform one or more statistical combinations of parameter influence. In some embodiments, the methods or systems described herein may apply various techniques to all timing arc types.

The method or system may perform the SCC-based general purpose circuit simulation in some embodiments. Contrary to static characterization where each strongly connected component is sensitized and simulated individually, some embodiments perform sensitization on the entire cell or arc and perform one or more simulations on each strongly connected component individually. In these embodiments, the method or system may propagate waveforms forward in the SCC topological order.

One of the advantages of these embodiments is that the general purpose simulation of an individual strongly connected component may be performed and completed faster than a corresponding simulation of an entire cell or an entire circuit while the impact on sensitivity accuracy may be reduced or minimized due to errors being cancelled out. Another advantage is that with sensitizing the entire electronic design and simulating each strongly connected component, various embodiments may thus perform logic cone analysis while ignoring the circuitry that is unrelated to the arc of interest and thus may complete the general purpose circuit simulations and the sensitization much faster, without sensitizing each strongly connected component individually. In some embodiments, the method or system perform the sensitization and general purpose circuit simulations without performing or having to perform static characterization.

Some embodiments are directed at implementing scalable statistical library characterization based at least in part upon and improve upon static characterization. These embodiments may scale upwards to meet the market trends of increasing cell complexities and increasing number of random variation parameters. In some embodiments, the method or system include three major processes or modules: (1) performing simulations on strongly connected components; (2) performing a logic cone sensitivity analysis; and (3) performing statistical combinations of parameter influence.

FIG. 1 illustrates a high level flow diagram for a method or system for implementing scalable statistical library characterization for electronic designs in some embodiments. In these embodiments, the method or system may identify an electronic design at 102. In some of these embodiments, an electronic design comprises a circuit design block in a library. The method or system may perform simulations on one or more strongly connected components in the electronic design at 104.

In some embodiments, a strongly connected component (SCC) of an electronic design includes a circuit component that provides feedback or signal to another portion of the electronic design or one or more other electronic designs. In various embodiments, a strongly connected component may include a digital circuit component or an analog circuit component in an electronic design and provide some feedback to one or more other portions of the electronic design. In some of these embodiments, a strongly connected block in an electronic design may include two or more channel connected circuit components (CCCs) or channel connected blocks (GCBs) that are merged or grouped together in the electronic design.

Channel connected circuit components and channel connected blocks may include, for example, inverters, logic gates (e.g., AND gates, NAND gates, OR gates, NOR gates, XOR gates, NOT gates, etc.), microcontrollers, Flip-Flops, etc. The method or system may perform logic cone sensitivity analysis for the electronic design at 106 and one or more statistical combinations of parameter influences at 108B. More details about each of the boxes illustrated in FIG. 1 are described below with reference to FIGS. 1A-E.

In some embodiments, the method or system may perform general purpose simulations (e.g., SPICE or Simulation Program with Integrated Circuit Emphasis simulations, other SPICE-like simulations or any other analog, digital, or mixed signal simulations) on one strongly connected component at a time, rather than performing a simulation for the entire electronic design or a portion of the electronic design including multiple strongly connected components. In some embodiments, the method or system may perform the general purpose simulations on one strongly connected component at a time, without performing or having to perform any Monte Carlo analyses or simulations.

Figure 1A:
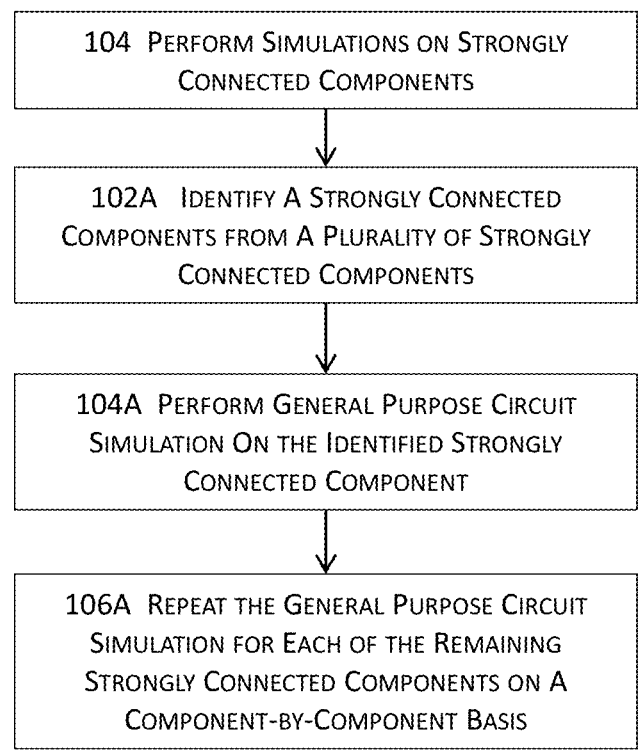
FIG. 1A illustrates a flow diagram for a process or module illustrated in FIG. 1 in some embodiments.

FIG. 1A illustrates a flow diagram for a process or module illustrated in FIG. 1 in some embodiments. More specifically, FIG. 1A illustrates a flow diagram for reference numeral 104 of FIG. 1. In these embodiments illustrated in FIG. 1A, the method or system may identify a strongly connected component from a plurality of strongly connected components of interest at 102A and perform one or more general purpose circuit simulations on the identified strongly connected component at 104A. At 106A, the method or system may repeat the performance of one or more general purpose circuit simulation for each of the remaining strongly connected components on a component-by-component basis. For example, the method or system may repeat the one or more general purpose circuit simulations for each of the remaining strongly connected component at a time until all of the strongly connected components of the electronic design are analyzed or simulated at 106A.

In these embodiments, the performance of the simulation program is no longer tied to the size of the electronic design at issue. In these embodiments, the method or system may sensitize the entire electronic design (e.g., a standard cell or an IP or intellectual property cell) altogether and simulate each strongly connected component individually. The method or system may propagate the simulated waveforms forward in the SCC topological order in a manner similar to that of a static characterization. This is in sharp contrast with convention static characterization approaches where each strongly connected component is sensitized individually.

Figure 1B:
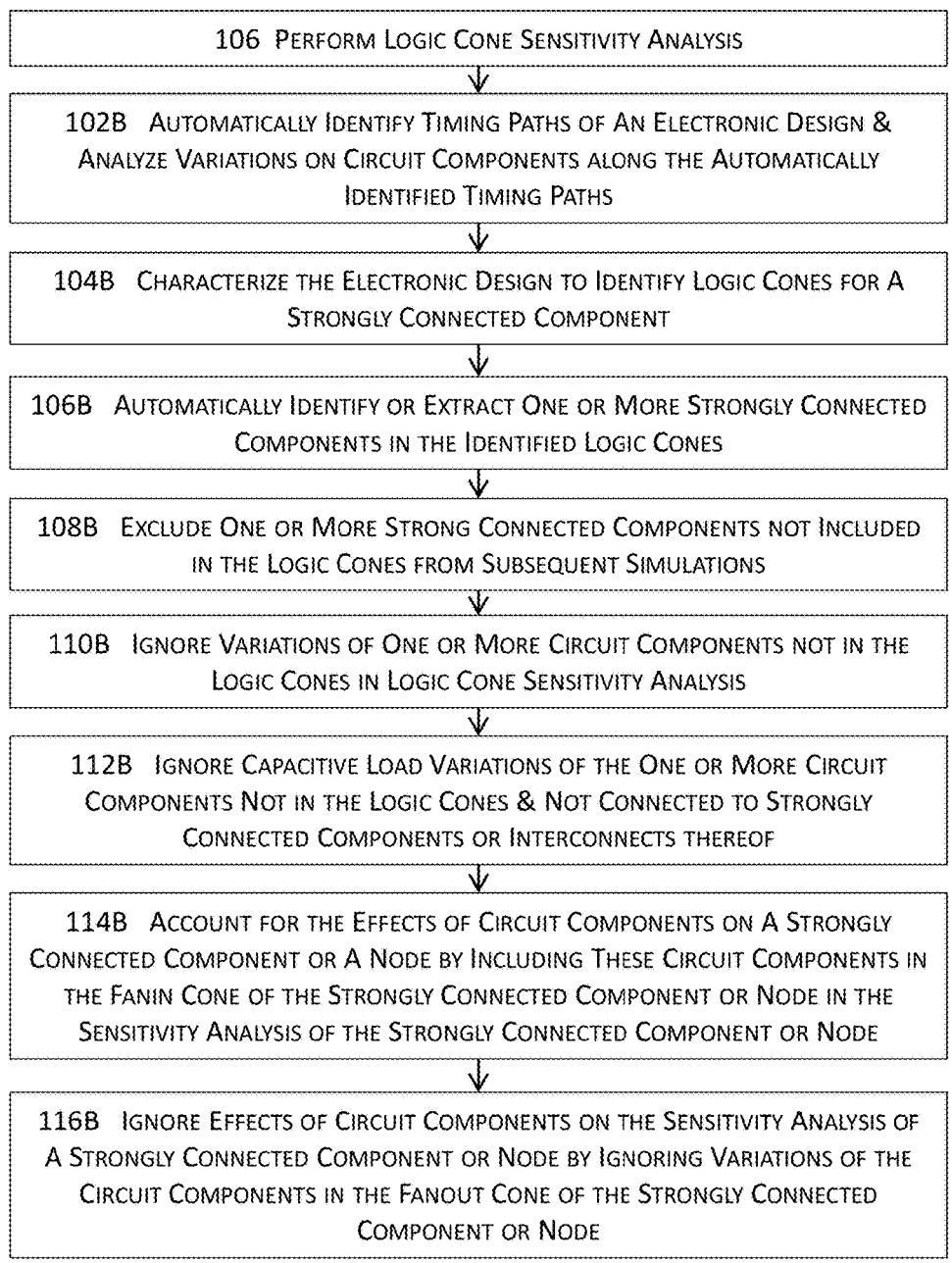
FIG. 1B illustrates a flow diagram for a process or module illustrated in FIG. 1 in some embodiments.

One of the advantages of these embodiments is that the general purpose simulation of an individual strongly connected component may be performed and completed faster than a corresponding simulation of an entire cell or an entire circuit while the impact on sensitivity accuracy may be reduced or minimal due to errors being cancelled out. Another advantage is that with sensitizing the entire electronic design and simulating each strongly connected component, various embodiments may thus perform logic cone sensitivity analysis while ignoring the circuitry that is unrelated to the arc of interest and thus may complete the general purpose circuit simulations and the sensitization much faster, without sensitizing each strongly connected FIG. 1B illustrates a flow diagram for a process or module illustrated in FIG. 1 in some embodiments. More specifically, FIG. 1B illustrates a flow diagram for reference numeral 106 of FIG. 1. In these embodiments illustrated in FIG. 1B, the method or system may perform the logic cone sensitivity analysis by at least automatically identifying timing paths and analyzing variations on circuit components (e.g., transistors) on the automatically identified timing paths at 102B of FIG. 1B. In some of these embodiments, the method or system may characterize an electronic design (e.g., by performing static characterization for an IP or intellectual property cell) to identify or provide the logic cones at 104B of FIG. 1B for one or more strongly connected components of interest.

In these embodiments, the method or system may provide the logic cones in such a way that the required or desired strongly connected components between a pin and a probe (e.g., a user selected probe or point of interest in the electronic design) may be automatically extracted at 106B of FIG. 1B. Some embodiments may further optionally, topologically sort the automatically extracted strongly connected components. In these embodiments where the method or system provides the logic cones to automatically extract the required or desired strongly connected components at 106B, the strongly connected components that are not included in these logic cones may be excluded at 108B of FIG. 1B in the subsequent simulations in some of these embodiments.

Figure 3:
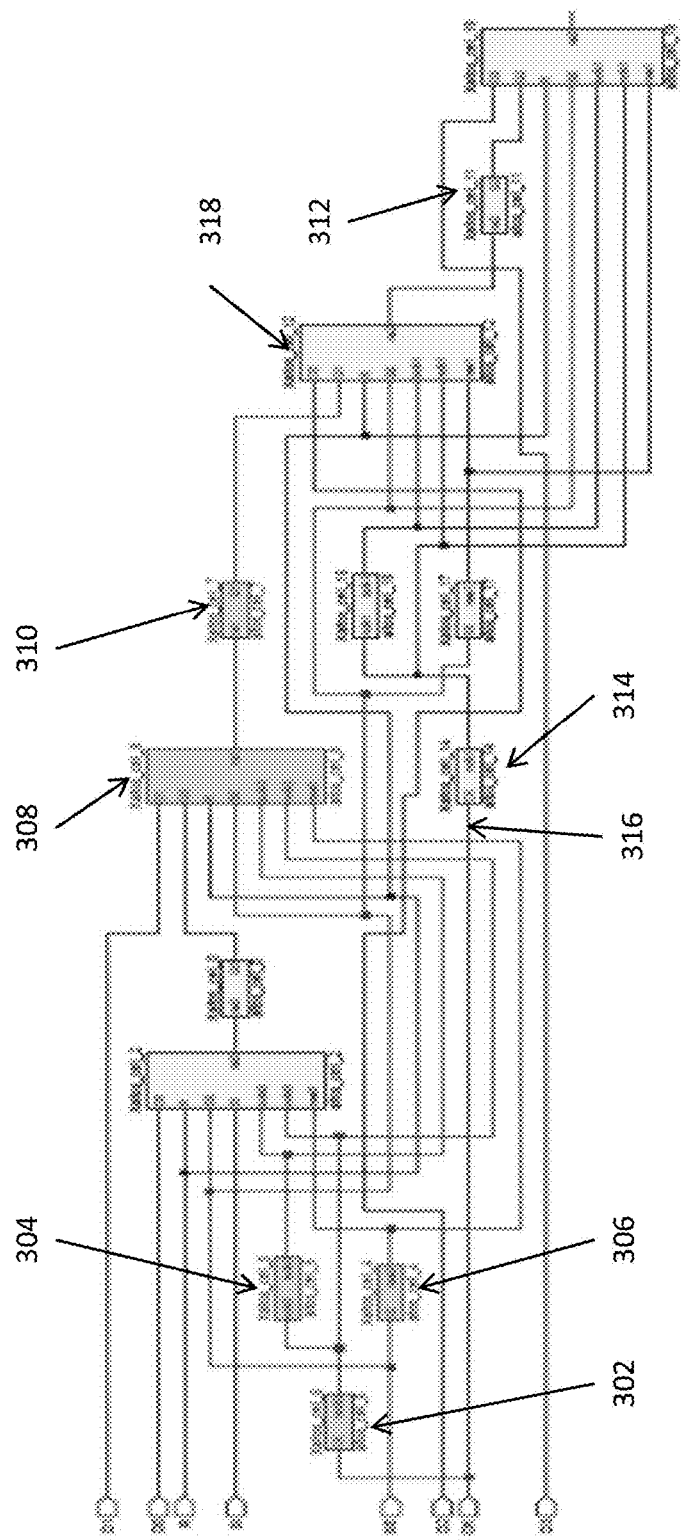
FIG. 3 illustrates a gate level view of a 4-bit SDFFR where each box represents a strongly connected component in some embodiments.

In addition or in the alternative, the method or system may also ignore the variations of circuit components (e.g., transistors) that are not within the logic cones at 10B. For example, FIG. 3 illustrates a gate level view of a 4-bit SDFFR (scan D flip-flop with reset) where each box represents a strongly connected component in some embodiments. It is assumed that the electronic design illustrated in FIG. 3 is subject to a constraint arc SE CK with probe Q1 being highlighted in red. The strongly connected components in the logic cone are cells 302, 304, 306, 308, and 310 in that order.

The method or system may perform a binary search, and the binary search iteration includes five general purpose circuit simulations (e.g., SPICE simulations, other SPICE-like simulations, or any other analog, digital, or mixed signal simulations)—one simulation for each strongly connected component. The method or system may not simulate the remaining, non-highlighted strongly connected components and interconnects. In the parameter variation analysis, the method or system may ignore the component parameter variations that are not in contact with the highlighted cells or interconnects in some embodiments. For example, the method or system may ignore the transistor variations of cell 312 during the parameter variation analysis.

In some embodiments, the method or system may ignore the capacitive load variations of circuit components (e.g., cells) that are not in the logic cone and are connected to one or more identified strongly connected components or interconnects in the logic cone at 1128. For example, the method or system may ignore the capacitive load variations of cell 314, which is not included in the logic cone but is connected to an interconnect 316 included in the logic cone because it is driven by a voltage source which may render the variation impact of cell 314 negligible. In some embodiments, the method or system may consider the circuit components (e.g., standard cells or IP cells) in the cone of a strongly connected component or a node of interest to account for the waveform and/or delay effects of these circuit components when analysing the sensitivity of the strongly connected component or node of interest at 1148.

For example, when analysing the sensitivity of the strongly connected component 308, the method or system may consider the circuit components 302, 304, and 306 in the fan-in cone of the strongly connected component 308 in order to account for the waveform and/or delay effects of these three circuit components. In addition or in the alternative, the method or system may ignore the component parameter variations in the fan-out cone of the strongly connected component or node of interest when analysing the sensitivity of the strongly connected component or node of interest at 1168. For example, the method or system may ignore the transistor parameter variations of cell 318 in the 4-bit SDFFR illustrated in FIG. 3.

Figure 1C:
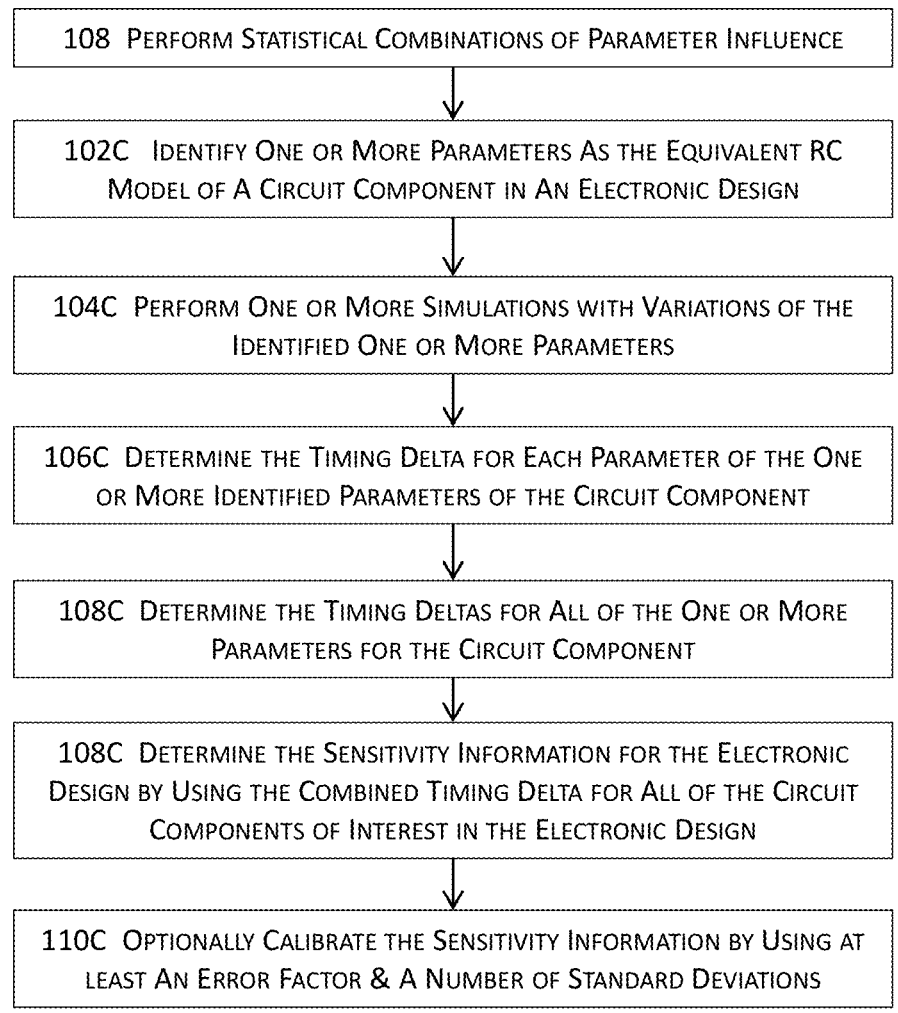
FIG. 1C illustrates a flow diagram for a process or module illustrated in FIG. 1 in some embodiments.

The method or system may further perform the simulation, logic cone sensitivity analysis, and statistical combination of parameter influences to all timing arc types as illustrated in FIG. 1C in some embodiments. FIG. 1C illustrates a flow diagram for a process or module illustrated in FIG. 1 in some embodiments. More specifically, FIG. 1C illustrates a flow diagram for reference numeral 108 of FIG. 1. In some of these embodiments, the method or system may perform the statistical combination of parameter influences on timing behaviour by at least automatically identifying one or more process parameters as the equivalent delay model (e.g., an RC delay model or an Elmore delay model) at 102C.

It shall be noted that the terms "Elmore delay model", "delay model", "RC model", and "RC delay model" may be used interchangeably throughout this application to indicate a model that approximates the delay of a circuit component through an RC network (a resistor-capacitor network or circuit). A process parameter identified at 102C may be termed as a dominant process parameter. The method or system may further perform one or more simulations with the variations of the identified one or more dominant process parameters at 104C to determine the simulated values of the corresponding sensitivity information of the one or more process parameters.

In some embodiments where a statistical model (e.g., a statistical SPICE model or sub-circuit) with multiple process parameters (e.g., multiple random process parameters) is used, the method or system may determine the timing delta from the parameter variations (e.g., variations of one transistor parameter) of each process parameter at 106C and statistically combine the timing deltas for all of the circuit components of interest (e.g., transistors of interest) in the electronic design at 108C. For example, the method or system may determine the timing deltas for a total of "p" process parameters of a total number of "m" transistors of interest by using the following equation (3):

$$\sqrt{\Sigma_p \Sigma_m d^2}, \tag{1}$$

Where d denotes timing delta, m=the number of transistors, and p=the number of random parameters in Eq. (1) in some embodiments. Eq. (1) illustrates a linear combination, and thus the order of p and m is interchangeable. In some of these embodiments, the method or system may first determine the total influence or sensitivity information from all of the random parameters on a single component or node of interest (e.g., a transistor) "m" with the following equation (2):

$$\sqrt{\Sigma_p d_m^2}, \quad (2)$$

The method or system may then determine the sensitivity information for the electronic design by using the combined timing delta for all of the circuit components or nodes of interest at 108C. It shall be noted that there may be "k" sigma where the following equation holds:

$$\sqrt{\Sigma_p d_m^2} = \Sigma_p d_{mk}, \quad (3)$$

The method or system may determine "k" and set all random parameters to "k" sigma in the general purpose circuit simulations (e.g., SPICE, other SPICE-like simulations, or any other analog, digital, or mixed signal simulations). In some embodiments, the method or system may further optionally calibrate the sensitivity information by using at least an error factor and a number of standard deviations at 110C. An error factor includes a factor or a number that indicates the deviation of a value predicted by a model (e.g., an RC model described above) and the corresponding value obtained by more rigorous simulations (e.g., general purpose circuit simulations).

In some embodiments, the number of standard deviations indicates that nearly all values or results (e.g., sensitivity value) statistically fall within the number of standard deviations of the mean in a normal distribution. In some embodiments as described below with reference to equations (3), the method or system may determine the number of standard deviations based at least in part upon what the intended percentage of the values or results is to fall within the mean in a normal distribution. In these embodiments, the number of the general purpose circuit simulations may be independent of the number of random parameters in the statistical simulation model.

In some of these embodiments, the method or system may use the RC delay model to determine the value "k" of standard deviations and assume a unique error factor "e" to account for the effects of approximation with the RC model that causes errors between what the RC delay model predicts and what the more rigorous general purpose circuit simulation generates. In some embodiments, the method or system may pre-characterize the RC values for each circuit component and store the pre-characterization results in a data structure (e.g., a look-up table or a database) for subsequent look-up or queries. In some embodiments, the method or system may further include some or all random parameter variations over one or more standard deviation values (e.g., sigma values as in three-sigma rule, six-sigma rule, etc.) to allow for subsequent linear or non-linear interpolation. For example, the method or system may determine the timing delta by using the following equations:

$$d = \sqrt{\Sigma d_p^2} = \sqrt{\Sigma (e \times t_p)^2} = e\sqrt{\Sigma t_p^2} = e \times \Sigma t_{pk}, \quad (3)$$

In the above equations, the method or system may compute $\sqrt{\Sigma t_p^2}$, and thus may computer the value of "k". It shall be noted that the final term $e \times \Sigma t_{pk}$ includes an error "e" that will be eliminated with the general purpose circuit simulations.

Figure 1D:
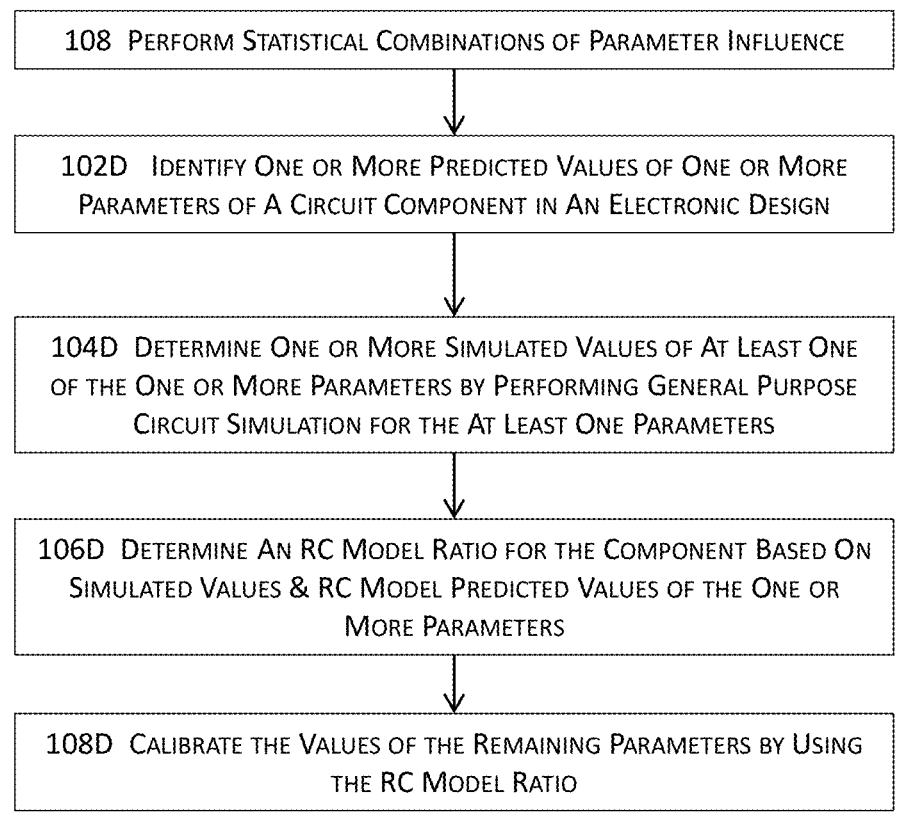
FIG. 1D illustrates a flow diagram for a process or module illustrated in FIG. 1 in some embodiments.

In some other embodiments, the method or system may simulate a parameter with stronger or the strongest influence as predicted by the RC delay model as illustrated in FIG. 1D, rather than simulating or having to simulate with all parameters changing at some sigma. The method or system may then interpolate the timing influence from the other parameters based at least in part upon the simulation results of the strongest parameter. FIG. 1D illustrates a flow diagram for a process or module illustrated in FIG. 1 in some embodiments. More specifically, FIG. 1D illustrates another flow diagram for reference numeral 108 of FIG. 1. In some of these embodiments illustrated in FIG. 1D, the method or system may identify one or more predicted values of one or more process parameters of a circuit component in an electronic design at 102D.

The method or system may further determine one or more simulated values at 104D that correspond to the one or more process parameters identified at 102D by performing general purpose circuit simulations for the identified one or more process parameters of a plurality of process parameters. The method or system may then determine an RC model ratio at 106D for the component based at least in part upon the one or more simulated values identified at 104D and the one or more predicted values identified at 102D. The method or system may further calibrate the values of the remaining process parameters of the plurality of process parameters of the circuit component in the electronic design at 108D and repeat the same process flow from 102D to 108D until all of the circuit components of interest have been similarly processed.

A working example is provided in the illustrative table of FIG. 4 which shows a table including the timing sensitivity information as predicted by the corresponding RC model for each transistor—parameter combination in some embodiments. As illustrated in FIG. 4 and with the flow diagram illustrated in FIG. 1D, the method or system selects dxl for simulation and generates an arc sensitivity value of, for example, 30 for transistor M1. The method or system may then determine the sensitivity values of the remaining parameter for transistor M1 based on the RC model ratio ($MR_{RC}$), which is determined by dividing the simulated arc sensitivity value by the arc sensitivity predicted by the RC model. In this example illustrated in FIG. 4, the method or system may determine the RC model ratio to be 1.2 (or 30 divided by 25). Using the RC model ratio, the method or system may then determine or calibrate the sensitivity values of the remaining parameters of transistor M1 by interpolation as shown in equations (4)-(7) below:

$$Tox_c = Tox \times MR_{RC} = 4 \times 1.2 = 4.8; \quad (4)$$

$$Dxw_c = Dxw \times MR_{RC} = 1 \times 1.2 = 1.2; \quad (5)$$

$$Parl1_c = Parl1 \times MR_{RC} = 9 \times 1.2 = 10.8; \quad (6)$$

$$Parl2_c = Parl2 \times MR_{RC} = -16 \times 1.2 = 19.2; \quad (7)$$

The suffix "c" in equations (4)-(7) denotes that the calibrated Similarly, the method or system may select parameter Dxl (or other parameter) for transistor M3 or M4 for simulation to determine the arc sensitivity, determine the corresponding RC model ratio, and determine the sensitivity values of the remaining parameters by interpolation for each transistor. It shall be noted that the method or system may ignore transistor M2 due to the negligible timing influences indicated by the sensitivity values for transistor M2.

In some embodiments, the method or system may also select more than one parameter for simulation to determine the respective, simulated sensitivity values for the selected parameters, determine the corresponding RC model ratio by using any suitable statistical techniques, and interpolate or calibrate the sensitivity values of the remaining parameters by interpolation. In the illustrated example of FIG. 4, the method or system performs three general purpose circuit simulations for three (3) of the four transistors of interest while ignoring transistor M2 due to its negligible, predicted timing influences or sensitivity values. This is in sharp contrast with conventional approaches that perform twenty (20) general purpose circuit simulations for the same set of transistors and parameters of interest.

Figure 1E:
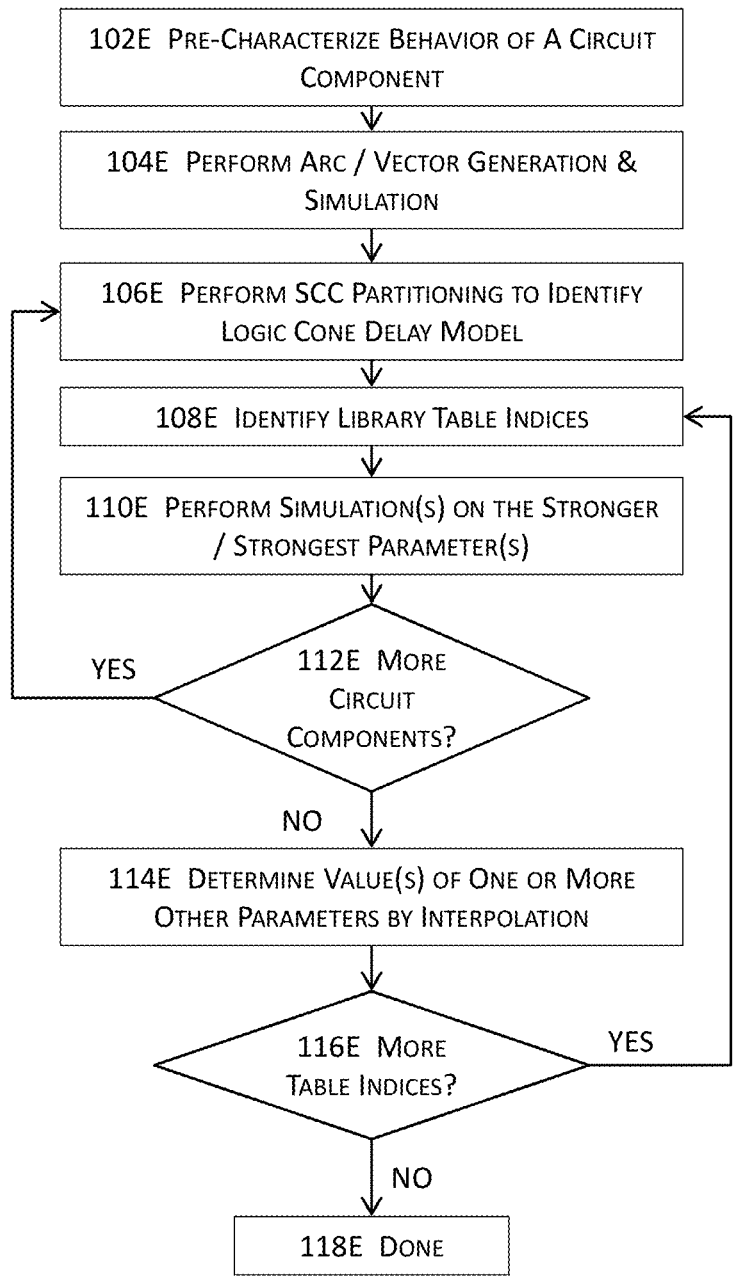
FIG. 1E illustrates a more detailed flow diagram for a method or system for implementing scalable statistical library characterization for electronic designs in some embodiments.

FIG. 1E illustrates a more detailed flow diagram for a method or system for implementing scalable statistical library characterization for electronic designs in some embodiments. In these embodiments illustrated in FIG. 1E, the method or system may pre-characterize the behaviour of a circuit component at 102E and perform arc and vector generation and/or simulation at 104E. A vector may represent possible data bits to one or more inputs and nodes of one or more logic gates in the electronic design in some embodiments. An arc may represent an input-to-output pair in the logic gate in some embodiments.

The method or system may automatically determine the vectors and arcs by at least testing all input-outputs of a logic gate for a plurality of rising and falling signal combinations and eliminating one or more of the plurality of rising and falling signal combinations if the one or more of the plurality of rising and falling combinations do not conform with a logic of true logic gate in some embodiments. In some of these embodiments, the method or system may exhaustively test all the input-outputs of the logic for a plurality of rising and falling signal combinations. More details about vector and arc generation or determination is described in U.S. Pat. No. 7,937,256, the content of which is hereby expressly incorporated by reference for all purposes.

At 106E, the method or system may identify the logic cone RC delay models by performing SCC (strongly connected component) partitioning to identify which circuit components are of interest. For example, the method or system may perform the SCC partitioning for the circuit components of a cell to identify which circuit components may be of particular interest for which the method or system may perform simulations. Some techniques of the SCC partitioning are described in the preceding paragraphs with reference to FIG. 1B.

The method or system may further identify the library table indices or parameters at 108E. A library table index corresponds to a circuit component of interest in an electronic design in some embodiments. For each library table index or parameter identified at 108E, the method or system may perform simulations (e.g., one or more general purpose circuit simulations) for the circuit component pre-characterized at 102E with the variations of one or more stronger parameter or the strongest parameter at 110E.

The method or system may further determine whether or not there are more circuit components of interest to be processed at 112E. If the determination is affirmative, the method or system may return to 106E to identify the next circuit component of interest and repeat the actions from 106E to 112E until all of the circuit components of interest have been substantially similarly processed.

If the determination at 112E is negative, the method or system may proceed to 114E to determine the corresponding values of the remaining parameters not included in the simulations at 110E by using various interpolation techniques. The method or system may then determine whether there are more library table indices to be processed at 116E. If so, the method or system may return to 108E to identify the next table index and repeat the actions of 108E through 116E until all of the library table indices have been similarly processed. If all of the library table indices have been processed, the process ends at 118E for the electronic design of interest.

Figure 1F:
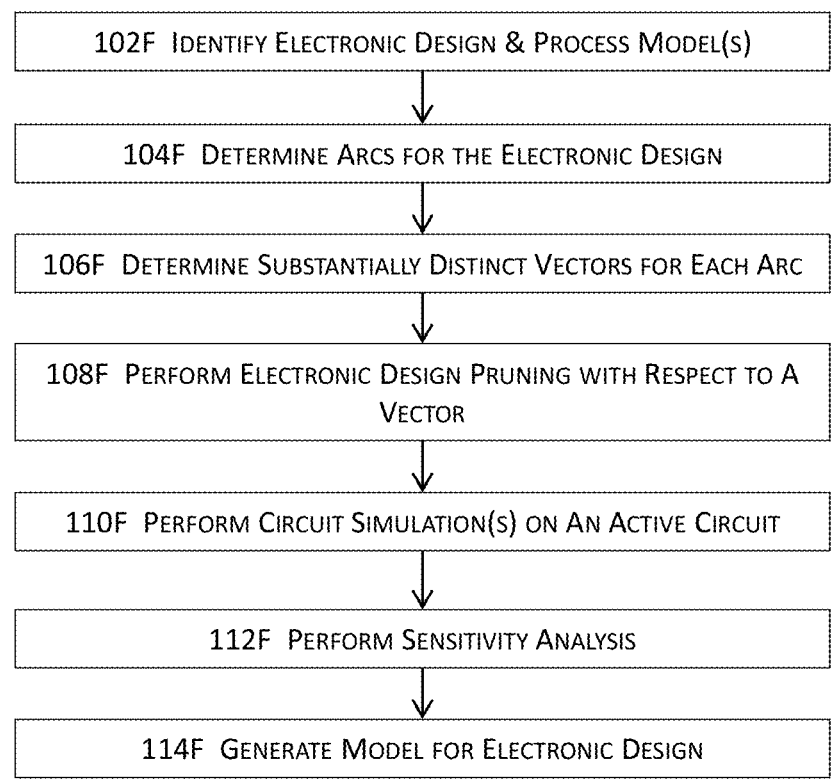
FIG. 1F illustrates a flow diagram for a method or system of library characterization in some embodiments.

FIG. 1F illustrates a flow diagram for a method or system of library characterization in some embodiments. In these embodiments, the method or system may, at 102F, identify an electronic design and one or more process models of corresponding manufacturing processes that may exert an impact on the manufacturing, performance, and/or reliability of the electronic design. At 104F, the method or system may determine a plurality of arcs for the electronic design. The plurality of arcs may include, for example, input-to-output arc for each logic gate in the electronic design.

The method or system may determine substantially distinct vectors for each of the plurality of arcs at 106F. For example, the method or system may identify and omit redundant vectors that are identical or substantially similar. Two vectors may be considered to be identical when the resulting electrical or timing behaviors (e.g., timing, delay, power, and/or noise behaviors) are identical in some embodiments. Two vectors may be considered to be substantially similar when the resulting electrical or timing behaviors are determined to be within a certain range of variations in some embodiments.

Two vectors may be considered to be identical or substantially similar when the resulting electrical or timing behaviors are determined to be outside the certain range of variations in these embodiments. At 108F, the method or system may perform electronic design pruning with respect to a vector by identifying one or more portions of the electronic design (e.g., an intellectual property or IP library cell design) that affect the performance of the electronic design for an identified vector and considering, for example, the transistors in these one or more portions of the electronic design for subsequent simulations and/or analyses (e.g., logic cone analysis).

In some embodiments, the method or system may perform electronic design pruning by applying one or more vectors and monitoring the sensitivity of one or more nodes in the electronic design to identify the one or more portions of the electronic design that are not sensitive by the vector. These one or more portions are not considered in subsequent simulations or analyses for the identified vector and may thus be considered as "pruned" from the electronic design for the identified vector.

At 110F, the method or system may perform one or more circuit simulations (e.g., general purpose circuit simulations such as SPICE, SPICE-like simulations, or any other analog, digital, or mixed signal simulators) or emulations (e.g., by predicting the behaviors of the electronic design with a simplified model such as an RC delay model) on an active circuit of the electronic design to determine the effects of a parameter on the electrical behavior of a circuit component (e.g., a strongly connected component of interest). An active circuit includes the portion of the electronic design that is the result of the electronic design pruning at 108F.

At 112F, the method or system may perform the sensitivity analysis to determine the influence of variations of various parameters of a circuit component, and generate a model, which has been characterized, for the electronic design. The model may include various data or information about or resulting from the simulations, emulations, various parameters, sensitivity, and/or analyses. The method or system illustrated in FIG. 1F may be used to characterize one or more stronger circuit components or the strongest circuit component, and the characterization results may be used to calibrate the other circuit components of interest as described above.

Figure 2:
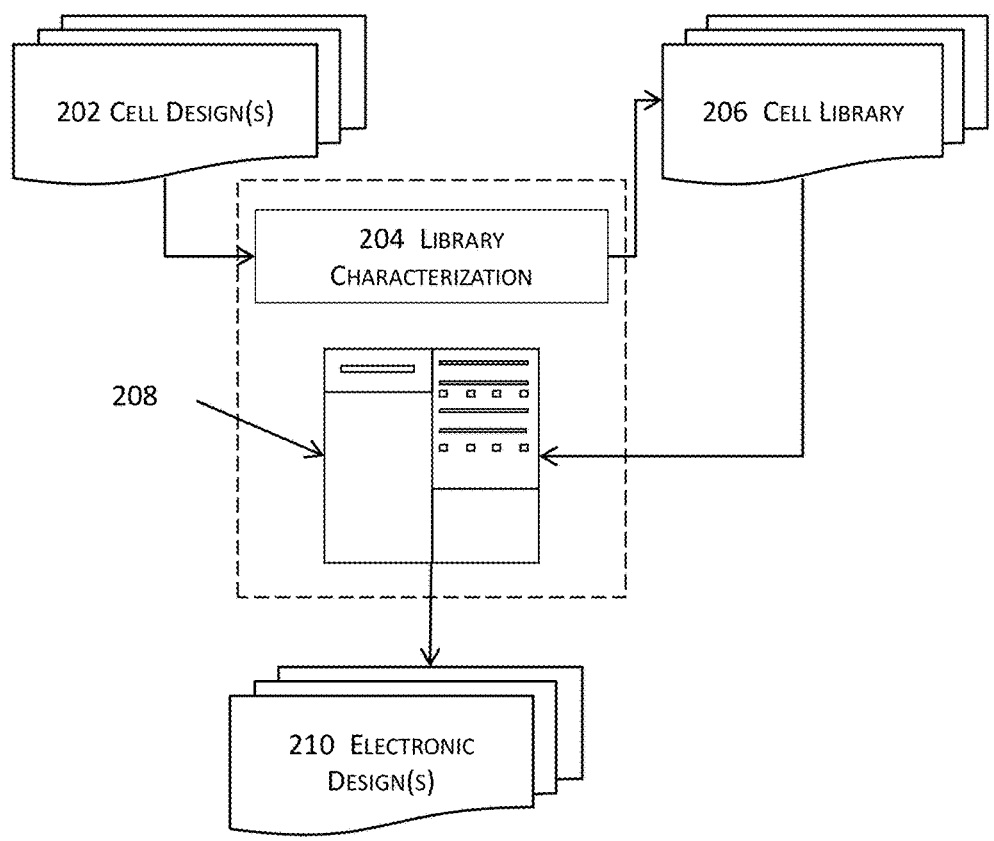
FIG. 2 illustrates an environment in which various techniques described herein may be implemented in some embodiments.

FIG. 2 illustrates an environment in which various techniques described herein may be implemented. The environment includes a plurality of cell designs 202 that may be characterized by using various processes or modules 205 described herein. The characterized cell designs 202 via the library characterization 204 may be stored in the cell library 206. During implementation of an electronic design (e.g., various synthesis steps, placement, or routing), the cell library 206 may be referenced and used by one or more electronic design automation (EDA) tools 208 (e.g., behaviour synthesis tool, logic synthesis tool, prototyping tool, floorplanning tool, placement tool, router, post-route optimizers, or any combinations thereof) to implement and generate the electronic designs 210 in various suitable formats.

Figure 2A:
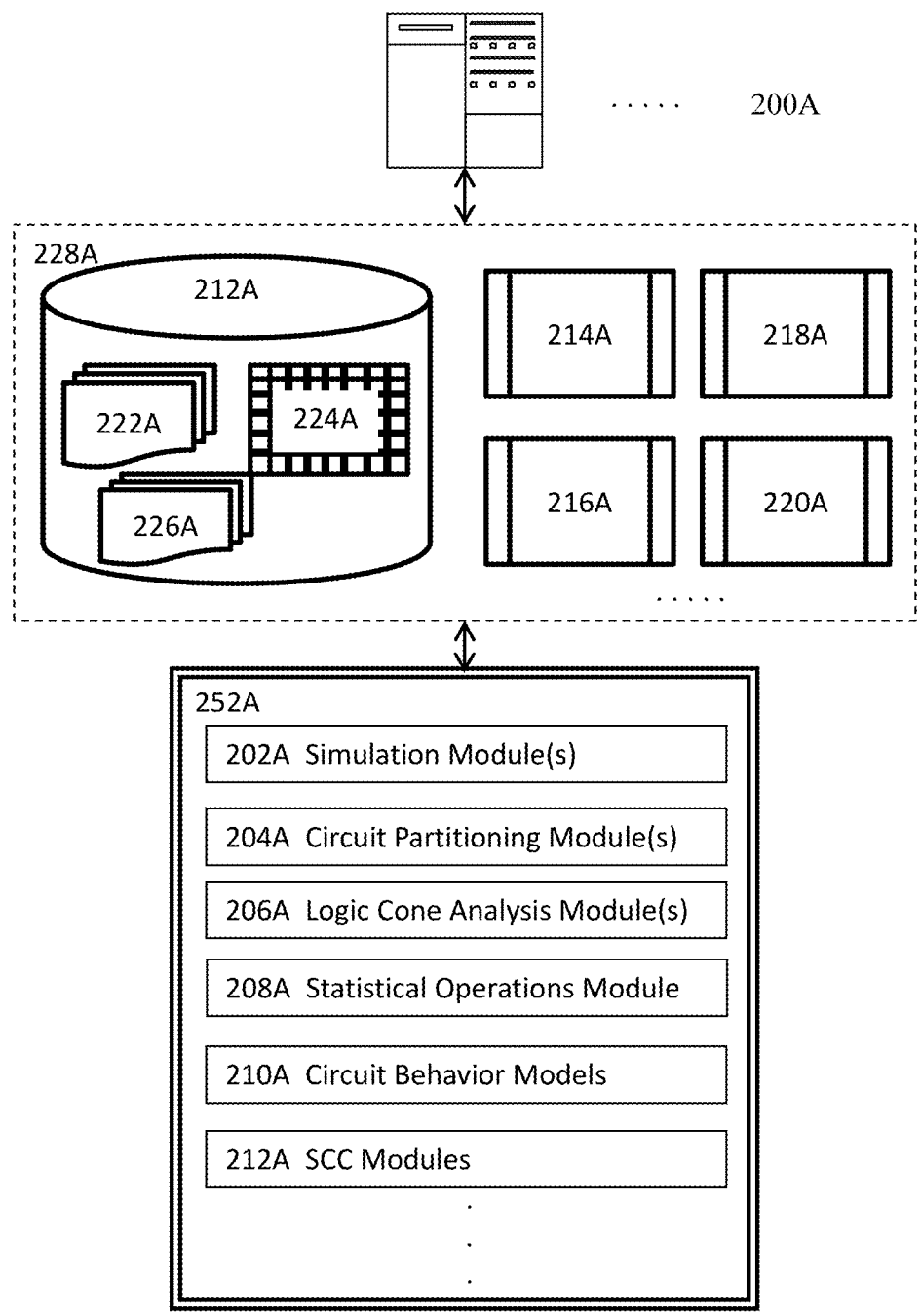
FIG. 2A illustrates a high level block diagram for a method or a system for implementing scalable statistical library characterization for electronic designs in some embodiments.

FIG. 2A illustrates a high level block diagram for a method or a system for implementing scalable statistical library characterization for electronic designs in some embodiments. In one or more embodiments, the system for implementing additional connectivity for electronic designs may comprise one or more computing systems 200A, such as a general purpose computer described in the System Architecture Overview section to implement one or more special proposes.

In some embodiments, the one or more computing systems 200A may invoke various system resources such as the processor(s) or processor core(s), memory, disks, etc. The one or more computing systems 200A may also initiate or interact with other computing systems to access various resources 228A that may comprise a global routing engine, a conduit routing engine (also referred to as G-routing engine or corridor routing engine), and/or a detail routing engine 214A, a layout editor 216A, a design rule checker 218A, a verification engine 220A, etc. The one or more computing systems 200A may further write to and read from a local or remote volatile or non-volatile computer accessible storage 212A that stores thereupon data or information such as, but not limited to, one or more data structures including lists, tables, and databases (224A) such as schematic design database(s) or physical design database(s), libraries, data, rule decks, constraints, etc. (222A), or other information or data (226A) that may be used to facilitate the performance of various functions to achieve the intended purposes.

In some embodiments, the one or more computing systems 200A may, either directly or indirectly through various resources 228A to invoke various software, hardware modules or combinations thereof 252A that may comprises one or more simulation modules 202A to perform various simulations such as general purpose simulations, simulations with finite difference techniques, etc., one or more circuit partitioning modules 204A to partition an electronic design into one or more logic cones, one or more logic cone analysis modules 206A to perform logic cone analysis, one or more statistical operations modules 208A to perform various statistical or mathematical operations (e.g., statistical combinations of parameter influences), one or more circuit behavior modules 210A to generate, access, or otherwise manipulate various models describing or predicting circuit behaviors such as an RC delay model, and one or more SCC (strongly connected component) modules 250A to perform various operations on strongly connected components (e.g., identifying or determining which SCCs are of interest), etc.

SYSTEM ARCHITECTURE OVERVIEW

Figure 5:
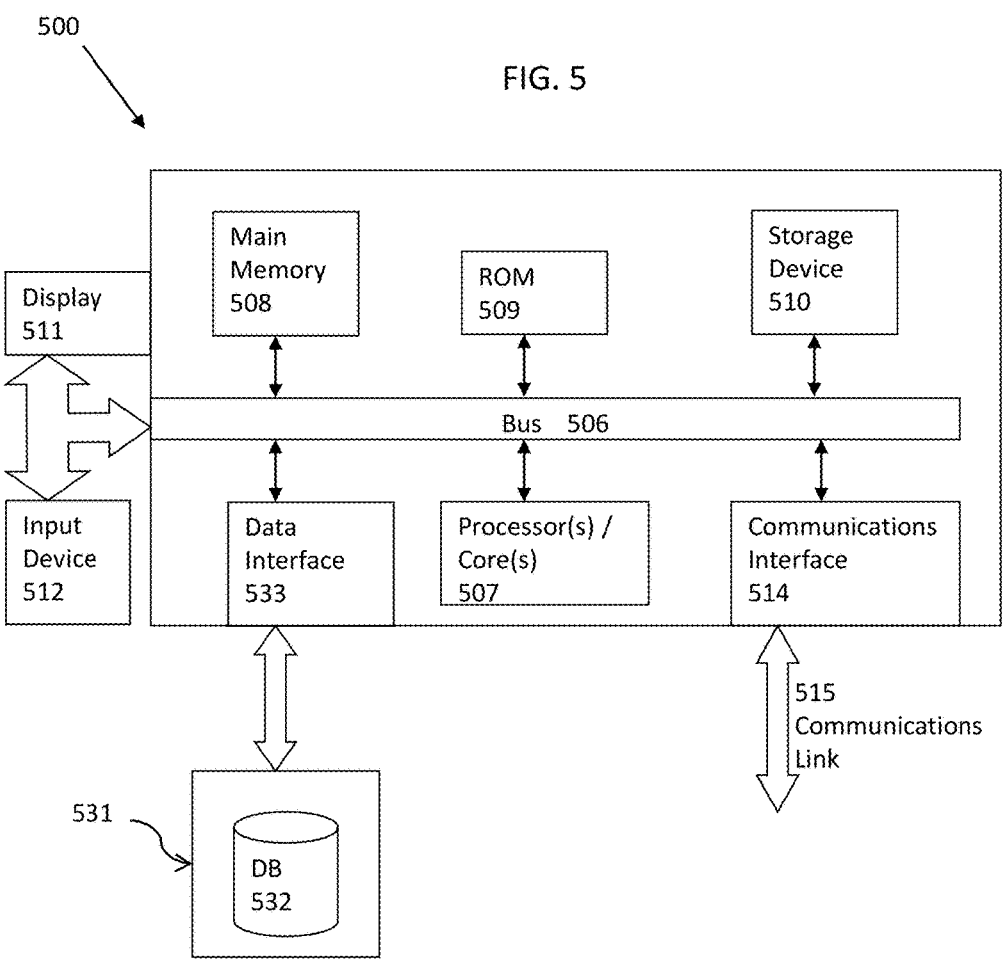
FIG. 5 illustrates a computerized system on which a method for implementing scalable statistical library characterization for electronic designs may be implemented.

FIG. 5 illustrates a block diagram of an illustrative computing system 500 suitable for implementing a physical electronic circuit design with multiple-patterning techniques as described in the preceding paragraphs with reference to various figures. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control (not shown).

According to one embodiment, computer system 500 performs specific operations by one or more processor or processor cores 507 executing one or more sequences of one or more instructions contained in system memory 508. Such instructions may be read into system memory 508 from another computer readable/usable storage medium, such as static storage device 509 or disk drive 510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 507, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 515 (e.g., LAN, PTSN, or wireless network) may perform the sequence of instructions required to practice the invention in coordination with one another.

Computer system 500 may transmit and receive messages, data, and instructions, including program, i.e., application code, through communication link 515 and communication interface 514. Received program code may be executed by processor 507 as it is received, and/or stored in disk drive 510, or other non-volatile storage for later execution. In an embodiment, the computer system 500 operates in conjunction with a data storage system 531, e.g., a data storage system 531 that includes a database 532 readily accessible by the computer system 500. The computer system 500 communicates with the data storage system 531 through a data interface 533. A data interface 533, which is coupled to the bus 506, transmits and receives electrical, electromagnetic or optical signals that include data streams representing various types of signal information, e.g., instructions, messages and data. In embodiments of the invention, the functions of the data interface 533 may be performed by the communication interface 514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing scalable statistical library characterization for electronic designs, comprising:
   using at least one processor or at least one processor core to perform a process, the process comprising:
   identifying an electronic design;
   performing one or more simulations on a plurality of strongly connected components in the electronic design;
   performing logic cone sensitivity analysis for the electronic design; and
   characterizing at least one strongly connected component in the electronic design by performing combinations of influences of a plurality of parameters of the plurality of strongly connected components in the electronic design based in part or in whole upon logic cone sensitivity analysis results, wherein the plurality of parameters comprises one or more process parameters, one or more device parameters, or a combination of at least one process parameters and at least one device parameter.

2. The computer implemented method of claim 1, wherein the one or more simulations are performed on a component-by-component basis.

3. The computer implemented method of claim 1, the act of performing the one or more simulations comprising:
   identifying a strongly connected component from the plurality of strongly connected components of the electronic design; and
   performing the one or more simulations on the strongly connected component that has been identified, wherein the one or more simulations include a general purpose circuit simulation.

4. The computer implemented method of claim 3, the act of performing the one or more simulations further comprising:
   repeating the one or more simulations on one or more remaining strongly connected components after the strongly connected component of the plurality of strongly connected components has been identified, wherein
   the strongly connected component includes a circuit component that generates a feedback to another circuit component in the electronic design.

5. The computer implemented method of claim 1, wherein the act of performing the logic cone sensitivity analysis comprises:
   automatically identifying one or more timing paths of the electronic design; and
   analyzing variations on one or more circuit components along the one or more timing paths.

6. The computer implemented method of claim 5, wherein the act of performing the logic cone sensitivity analysis further comprises:
   characterizing the electronic design to identify one or more logic cones for the at least one strongly connected component in the electronic design; and
   automatically extracting one or more strongly connected components in the one or more logic cones.

7. The computer implemented method of claim 6, wherein the act of performing the logic cone sensitivity analysis further comprises:
   identifying at least one first strongly connected component that is not within the one or more logic cones; and
   excluding the at least one first strongly connected component from further analyses or simulations.

8. The computer implemented method of claim 6, wherein the act of performing the logic cone sensitivity analysis further comprises at least one of:
   ignoring variations of one or more first circuit components in the logic cone sensitivity analysis, wherein
   the one or more first circuit components are not in the one or more logic cones;
   ignoring capacitive load variations of one or more second circuit components, wherein
   the one or more second circuit components are in the one or more logic cones and are not connected to strongly connected components or one or more interconnects connected to the strongly connected components; and
   ignoring effects of a circuit component on the logic cone sensitivity analysis of a first strongly connected component by neglecting variations of the circuit component, wherein
   the circuit component is in a fan-out cone of the first strongly connected component.

9. The computer implemented method of claim 5, wherein the act of performing the logic cone sensitivity analysis further comprises:
   accounting for an impact of a circuit component on a first strongly connected component by including the circuit component in the logic cone sensitivity analysis for the first strongly connected component, wherein the circuit component is within a fan-in cone of the first strongly connected component.

10. The computer implemented method of claim 1, wherein the act of characterizing the electronic design by performing the combinations of the influences comprises:

identifying one or more parameters as an equivalent behavior model of a strongly connected component of the electronic design; and performing the one or more simulations with variations of the one or more parameters.

11. The computer implemented method of claim 10, wherein the act of characterizing the electronic design by performing the combinations of the influences further comprises:

determining behavior data for a parameter of the one or more parameters of the strongly connected component;

determining combined behavior data of all of the one or more parameters; and determining sensitivity data for the electronic design by using at least the combined behavior data for all of the plurality of strongly connected components.

12. The computer implemented method of claim 11, wherein the act of characterizing the electronic design by performing the combinations of the influences further comprises:

calibrating the sensitivity data by using at least an error factor and a number of standard deviations.

13. The computer implemented method of claim 11, wherein the act of characterizing the electronic design by performing the combinations of the influences further comprises:

determining one or more predicted values of one or more parameters of a strongly connected component of the plurality of strongly connected components by using one or more simplified models, without performing simulations; and determining one or more simulated values of at least one parameter of the one or more parameters by performing the one or more simulations with the at least one parameter.

14. The computer implemented method of claim 13, wherein the act of characterizing the electronic design by performing the combinations of the influences further comprises:

determine a ratio for the strongly connected component based at least in part upon the one or more simulated values and the one or more predicted values; and calibrating at least one of the one or more predicted values by using the ratio.

15. A system for implementing scalable statistical library characterization for electronic designs, comprising:

at least one processor or at least one processor core that is at least to:

identify an electronic design;

perform one or more simulations on a plurality of strongly connected components in the electronic design;

perform logic cone sensitivity analysis for the electronic design; and characterize at least one strongly connected component in the electronic design by performing combinations of influences of a plurality of parameters of the plurality of strongly connected components in the electronic design based in part or in whole upon logic cone sensitivity analysis results, wherein the plurality of parameters comprises one or more process parameters, one or more device parameters, or a combination of at least one process parameters and at least one device parameter.

16. The system of claim 15, wherein the at least one processor or at least one processor core that performs the logic cone sensitivity analysis is further to:

automatically identify one or more timing paths of the electronic design;

analyze variations on one or more circuit components along the one or more timing paths;

characterize the electronic design to identify one or more logic cones for the at least one strongly connected component in the electronic design; and automatically extracting one or more strongly connected components in the one or more logic cones.

17. The system of claim 15, wherein the at least one processor or at least one processor core that characterizes the electronic design by performing the combinations of the influences is further to:

identify one or more parameters as an equivalent behavior model of a strongly connected component of the electronic design;

perform the one or more simulations with variations of the one or more parameters;

determine behavior data for a parameter of the one or more parameters of the strongly connected component;

determine combined behavior data of all of the one or more parameters; and determine sensitivity data for the electronic design by using at least the combined behavior data for all of the plurality of strongly connected components.

18. An article of manufacture comprising a non-transitory computer accessible storage medium having stored thereupon a sequence of instructions which, when executed by at least one processor or at least one processor core executing one or more threads, causes the at least one processor or the at least one processor core to perform a process set of acts for implementing scalable statistical library characterization for electronic designs, the process set of acts comprising:

identifying an electronic design;

performing one or more simulations on a plurality of strongly connected components in the electronic design;

performing logic cone sensitivity analysis for the electronic design; and characterizing at least one strongly connected component in the electronic design by performing combinations of influences of a plurality of parameters of the plurality of strongly connected components in the electronic design based in part or in whole upon logic cone sensitivity analysis results, wherein the plurality of parameters comprises one or more process parameters, one or more device parameters, or a combination of at least one process parameters and at least one device parameter.

19. The article of manufacture of claim 18, the process for performing the logic cone sensitivity analysis comprising:

automatically identifying one or more timing paths of the electronic design;

analyzing variations on one or more circuit components along the one or more timing paths;

characterizing the electronic design to identify one or more logic cones for the at least one strongly connected component in the electronic design; and automatically extracting one or more strongly connected components in the one or more logic cones.

20. The article of manufacture of claim 18, the process for characterizing the electronic design by performing the combinations of the influences comprising:

identifying one or more parameters as an equivalent behavior model of a strongly connected component of the electronic design;

performing the one or more simulations with variations of the one or more parameters;

determining behavior data for a parameter of the one or more parameters of the strongly connected component;

determining combined behavior data of all of the one or more parameters; and determining sensitivity data for the electronic design by using at least the combined behavior data for all of the plurality of strongly connected components.

* * * * *